United States Patent
Hosoya et al.

(10) Patent No.: US 8,650,722 B2
(45) Date of Patent: Feb. 18, 2014

(54) CLIP FOR VEHICLE AND MOUNTING METHOD OF INTERIOR MEMBER USING SAME

(75) Inventors: Shizuo Hosoya, Takanezawa-machi (JP); Nobumoto Sekiguchi, Mibu-machi (JP)

(73) Assignee: Honda Motor Co., Ltd., Tokyo (JP)

( * ) Notice: Subject to any disclaimer, the term of this patent is extended or adjusted under 35 U.S.C. 154(b) by 865 days.

(21) Appl. No.: 12/205,150

(22) Filed: Sep. 5, 2008

(65) Prior Publication Data

US 2009/0064470 A1    Mar. 12, 2009

(30) Foreign Application Priority Data

Sep. 10, 2007  (JP) ................................ 2007-234653

(51) Int. Cl.
*A44B 99/00*     (2010.01)
*B60R 13/00*     (2006.01)

(52) U.S. Cl.
USPC ................... 24/289; 24/292; 411/45; 411/55

(58) Field of Classification Search
USPC ........... 24/289, 292, 293, 294, 295, 297, 458; 411/508, 509, 510, 511, 80.1, 55, 549, 411/552, 553, 554
See application file for complete search history.

(56) References Cited

U.S. PATENT DOCUMENTS

| | | | |
|---|---|---|---|
| 3,964,364 A * | 6/1976 | Poe | 411/43 |
| 4,007,516 A * | 2/1977 | Coules | 411/349 |
| 4,263,833 A * | 4/1981 | Loudin et al. | 411/41 |
| 4,422,222 A * | 12/1983 | Notoya | 24/614 |
| 4,442,571 A * | 4/1984 | Davis et al. | 411/552 |
| 4,647,262 A * | 3/1987 | Yokota | 411/44 |
| 5,368,427 A * | 11/1994 | Pfaffinger | 411/553 |
| 5,586,364 A * | 12/1996 | Ferrari et al. | 16/383 |
| 5,641,255 A * | 6/1997 | Tanaka | 411/48 |
| 5,669,108 A * | 9/1997 | Ferrari et al. | 16/383 |
| 5,775,860 A * | 7/1998 | Meyer | 411/46 |
| 6,045,309 A * | 4/2000 | LeVey | 411/45 |
| 6,261,042 B1 * | 7/2001 | Pratt | 411/551 |
| 6,676,324 B1 * | 1/2004 | Pleiss | 403/33 |
| 6,827,536 B1 * | 12/2004 | Leon et al. | 411/61 |
| 6,896,460 B2 * | 5/2005 | Enomoto et al. | 411/41 |

(Continued)

FOREIGN PATENT DOCUMENTS

| | | |
|---|---|---|
| CN | 1465869 | 1/2004 |
| JP | 2001-165134 | 6/2001 |
| JP | 2002-037007 | 2/2002 |

*Primary Examiner* — Robert J Sandy
*Assistant Examiner* — Rowland D Do
(74) *Attorney, Agent, or Firm* — Rankin, Hill & Clark LLP

(57) ABSTRACT

A clip for a vehicle including: a substantially hollow clip main unit that has a distal end portion to be fixedly pressed into a fixation member on a vehicle body side, and a base portion in which an opening is formed; and a main unit support member that is capable of supporting the clip main unit from an inside thereof in a state where the main unit support member is completely inserted into the opening of the clip main unit, wherein a clip linking device is provided to the clip main unit and the main unit support member for engaging the clip main unit with the main unit support member so as to restrict the relative displacement in the insertion direction between the clip main unit and the main unit support member, in a state where the main unit support member is half-inserted into the clip main unit.

6 Claims, 12 Drawing Sheets

(56) References Cited

U.S. PATENT DOCUMENTS

| | | | |
|---|---|---|---|
| 6,899,498 B2 * | 5/2005 | Lowry et al. | 411/55 |
| 6,955,515 B2 * | 10/2005 | Barina et al. | 411/508 |
| 7,207,758 B2 * | 4/2007 | Leon et al. | 411/45 |
| 7,281,303 B2 * | 10/2007 | Terrill et al. | 24/453 |
| 7,461,436 B2 * | 12/2008 | Asano | 24/297 |
| 7,677,850 B2 * | 3/2010 | Sano | 411/45 |
| 7,955,038 B2 * | 6/2011 | Silbereisen et al. | 411/552 |
| 7,976,056 B2 * | 7/2011 | Kirchen et al. | 280/728.2 |
| 7,993,084 B2 * | 8/2011 | Hitchcock | 411/45 |
| 2002/0021950 A1 | 2/2002 | Ichikawa | |
| 2003/0086771 A1 * | 5/2003 | Vassiliou | 411/55 |
| 2004/0175250 A1 * | 9/2004 | Yoneoka | 411/45 |
| 2008/0014045 A1 * | 1/2008 | Kawai | 411/45 |
| 2010/0146744 A1 * | 6/2010 | Welter et al. | 24/292 |

* cited by examiner

CLIP FOR VEHICLE AND MOUNTING METHOD OF INTERIOR MEMBER USING SAME

BACKGROUND OF THE INVENTION

Priority is claimed on Japanese Patent Application No. 2007-234653, filed on Sep. 10, 2007, the content of which is incorporated herein by reference.

FIELD OF THE INVENTION

The present invention relates to a clip for a vehicle and a mounting method of an interior member using the clip.

DESCRIPTION OF THE RELATED ART

As a mounting construction for a pillar garnish which is attached to a pillar portion of a vehicle body, there is proposed one in which a clip made of two parts is used to mount a pillar garnish onto a vehicle body (see Japanese Unexamined Patent Publication, First Publication No. 2001-165134).

In the present time, an examination is conducted inserting a clip into a mounting hole formed in an interior member such as a pillar garnish, and a distal end portion of the clip is fixed by pushing it into a fixation member while pressing the interior member with a head portion of the clip.

When a distal end portion of a clip is fixed by pushing it into a fixation member while pressing an interior member with a head portion of the clip in this manner, assembly of the interior member onto a vehicle body is comparatively facilitated. However, this requires a dedicated jig in assembly in order to apply a huge pressing load to the head portion of the clip. At this point, facilitation of assembly work of an interior member still leaves room for improvement.

Accordingly, the present invention has an object to provide a clip for a vehicle and a mounting method of an interior which can achieve further facilitation of assembly work of an interior member onto a vehicle body.

SUMMARY OF THE INVENTION

To achieve the above-described object, the present invention employs the following. Namely, the present invention employs a clip for a vehicle including: a substantially hollow clip main unit that extends through a mounting hole of an interior member and is engaged with the vehicle body mounting part, the clip main unit having a distal end portion to be fixedly pressed into a fixation member on a vehicle body side, and having a base portion in which an opening is formed; and a main unit support member that is capable of supporting the clip main unit from an inside thereof in a state where the main unit support member is completely inserted into the opening of the clip main unit, wherein the clip main unit and the main unit support member is provided with a clip linking device which allows the clip main unit and the main unit support member to be in an engagement state where the clip main unit and the main unit support member are engaged with each other so as to restrict the relative displacement in the insertion direction therebetween with the main unit support member being half-inserted into the clip main unit.

According to the above-described clip for a vehicle, when an interior member is mounted onto a vehicle body, the clip main unit and the main unit support member are engaged by the clip linking device so as to restrict the relative displacement in the axis direction between the clip main unit and the main unit support member in a state where the main unit support member is half-inserted into the opening in the base end portion of the clip main unit. In that state, a load is applied to the main unit support member, and thereby the distal end portion of the clip main unit is pressed into and fixed to the fixation member on the vehicle body side. After this, an engagement between the main unit support member and the clip main unit by the clip linking device is released, and the main unit support member is completely inserted into the opening of the clip main unit.

As a result, the main unit support member does not protrude from the clip main unit, and the main unit support member supports the clip main unit from the inside thereof, thereby restricting deformation or the like of the clip main unit.

That is, by inputting a load to the main unit support member which is engaged by the clip linking device in a state of being half-inserted into the clip main unit, the clip main unit can be pressed into and thereby fixed to the fixation member on the vehicle body side. As a result, an interior member can be mounted onto a vehicle body without using a dedicated jig or the like. Furthermore, by completely inserting the main unit support member into the clip main unit after fixedly pressing the clip main unit into the fixation member on the vehicle body side, the clip main unit can be supported from the inside thereof, and the appearance can also be improved.

It may be arranged such that the clip linking device places the clip main unit and the main unit support member into the engagement state by rotating in a predetermined direction the main unit support member half-inserted into the clip main unit, and the main unit support member is allowed to be inserted into the clip main unit after the main unit support member is further rotated from the engagement state.

In this case, by rotating the main unit support member in a predetermined direction by a predetermined angle in a state where the main unit support member is half-inserted into the clip main unit, the main unit support member and the clip main unit are engaged. When a load is input to the main unit support member in this state, the distal end portion of the clip main unit is pressed into and thereby fixed to the fixation member on the vehicle body side. After this, when the main unit support member is returned to its original rotation angle, and is pressed in the insertion direction (the axis direction), the main unit support member is completely inserted into the inside of the clip main unit.

That is, the main unit support member can be inserted into the clip main unit after rotating the main unit support member in a predetermined direction with respect to the clip main unit, ant the main unit support member can be inserted into the clip main unit after returning the main unit support member to its original rotation angle position. As a result, a worker can assemble a vehicle body mounting part onto the vehicle body efficiently through the above sequential operations.

It may be arranged such that the clip for a vehicle further includes: a restriction mechanism for restricting a rotation of the main unit support member with respect to the clip main unit in a state where the main unit support member is half-inserted into the clip main unit.

In this case, a rotation operation on the main unit support member is allowed only in the direction prescribed by the restriction mechanism.

That is, with the presence of the restriction mechanism, only in the case where a given procedure is followed, a rotation operation on the main unit support member is allowed. Therefore, an erroneous assembly of the clip main unit and the main unit support member can be prevented.

It may be arranged such that the main unit support member includes a load transmission portion for transmitting a load, along the insertion direction, which is input from the clip main unit to the main unit support member in the engagement state.

In this case, a pressing load which is input to the main unit support member can be transmitted to the clip main unit via the load transmission portion in a state where the main unit support member is engaged with the clip main unit so as to restrict the relative displacement in the insertion direction between the clip main unit and the main unit support member. As a result, pressing of the clip main unit through the main unit support member can be performed easily and securely.

Furthermore, the present invention also employs a mounting method of an interior member using a clip for a vehicle that includes: a substantially hollow clip main unit that extends through a mounting hole of an interior member and is engaged with the vehicle body mounting part, the clip main unit having a distal end portion to be fixedly pressed into a fixation member on a vehicle body side, and having a base portion in which an opening is formed; and a main unit support member that is capable of supporting the clip main unit from an inside thereof in a state where the main unit support member is completely inserted into the opening of the clip main unit, the method including the steps of: engaging the clip main unit with the main unit support member so as to restrict the relative displacement in the insertion direction between the clip main unit and the main unit support member in a state where the main unit support member is half-inserted into the clip main unit; pressing the main unit support member in the insertion direction, to thereby fixedly press the clip main unit into the fixation member on the vehicle body side while maintaining the engagement between the clip main unit and the main unit support member; and releasing the engagement between the clip main unit and the main unit support member and completely inserting the main unit support member into the clip main unit.

According to the above mounting method of an interior member, the clip main unit and the main unit support member are engaged so as to restrict the relative displacement in the insertion direction between the clip main unit and the main unit support member in a state where the main unit support member is half-inserted into the clip main unit. By pressing this main unit support member in the insertion direction, the clip main unit is pressed into and thereby fixed to the fixation member on the vehicle body side while maintaining an engagement between the clip main unit and the main unit support member. After that, the engagement between the clip main unit and the main unit support member is released, and the main unit support member is completely inserted into the clip main unit. As a result, an interior member can be mounted onto a vehicle body through an extremely simple operation.

It may be arranged such that the step of releasing the engagement between the clip main unit and the main unit support member and completely inserting the main unit support member into the clip main unit includes a step of rotating the main unit support member by a predetermined angle with respect to the clip main unit.

In this case, when the engagement between the clip main unit and the main unit support member for restraining their relative displacement in the insertion direction is released and the main unit support member is completely inserted into the clip main unit, the main unit support member is rotated by a predetermined angle with respect to the clip main unit. As a result, the steps from the release of the engagement between the main unit support member and the clip main unit to the insertion of the main unit support member into the clip main unit can be efficiently performed through a series of operations on the main unit support member.

DETAILED DESCRIPTION OF THE INVENTION

Hereunder is a description of an embodiment of the present invention with reference to the drawings. In the following description, directions such as up-down, left-right, and front-rear are with reference to a vehicle, unless otherwise specified.

Figure 1:
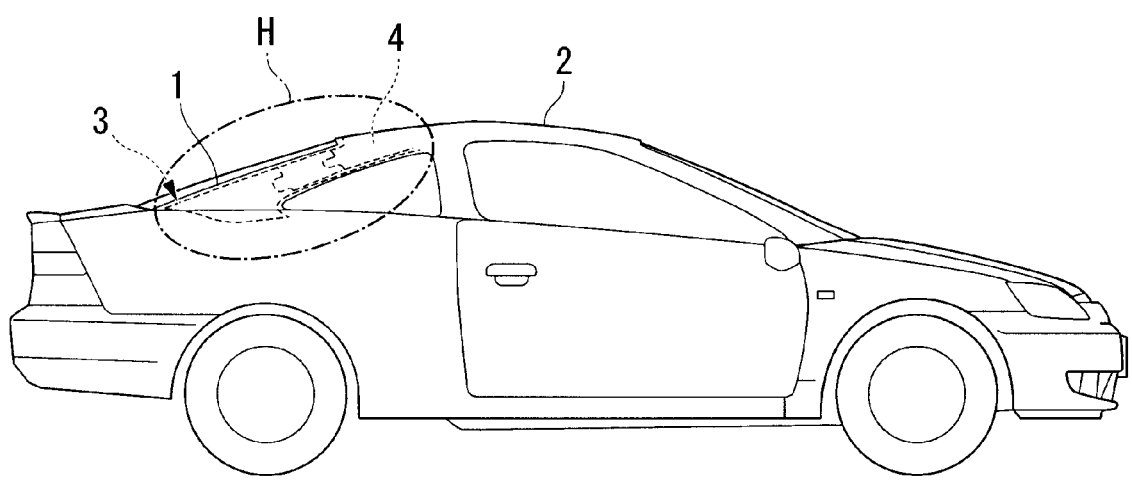
FIG. 1 is a side view of a vehicle showing an embodiment of the present invention.

FIG. 1 is a side view of a coupe-type vehicle. In the figure, reference numeral 1 denotes a rear pillar (a pillar portion) for connecting a roof portion 2 of the vehicle and a side surface on the rear side of the vehicle body. Because this vehicle is of a coupe type, the rear pillar 1 is gently inclined downward from the roof portion 2 to the rear side of the vehicle.

On the vehicle interior sides of the rear pillar 1 and the roof portion 2, there are respectively mounted a pillar garnish 3 and a roof lining 4 as interior members. From a side end portion of the roof portion 2 (a roof side rail portion) to a part of the rear pillar 1, there is mounted an airbag 5 of a curtain airbag apparatus (see the cross-sectional view of FIG. 7) in a folded state. A container portion for the airbag 5 is covered with the roof lining 4 and the pillar garnish 3 from the vehicle interior side.

Figure 2:
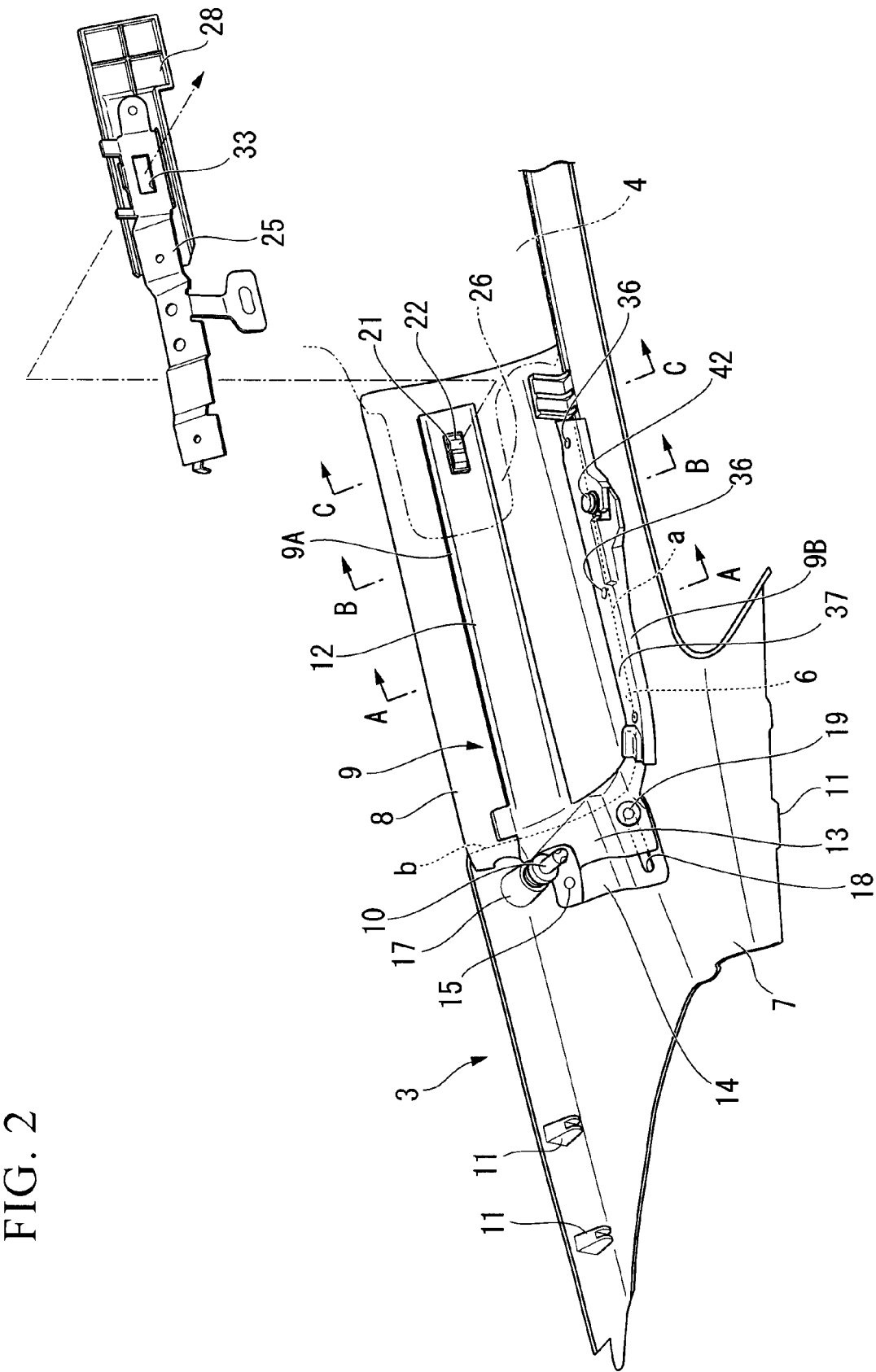
FIG. 2 is a rear view of an interior member arranged in the H portion of FIG. 1, seen from the vehicle exterior side.
Figure 3:
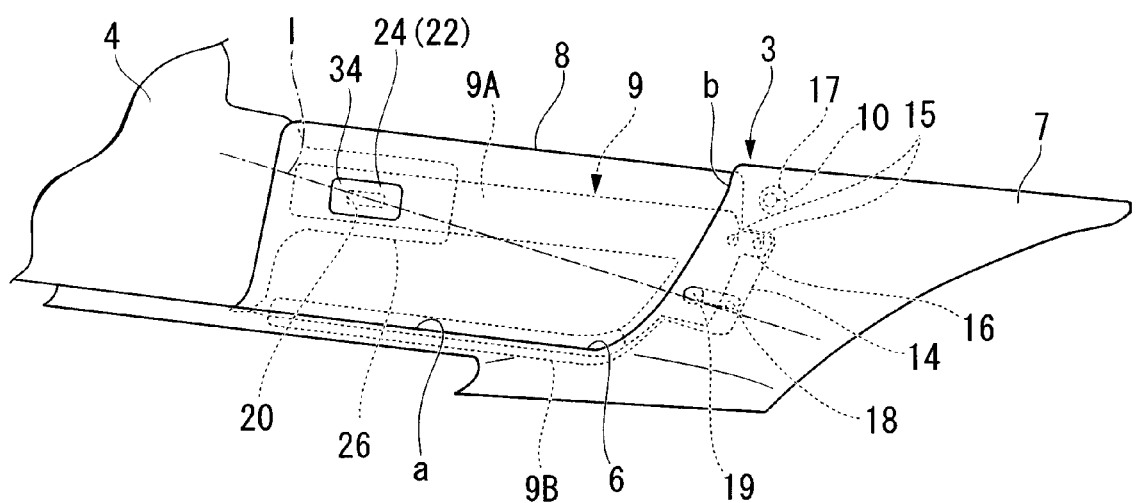
FIG. 3 is a front view of an interior member according to the embodiment, seen from the vehicle interior side.
Figure 4:
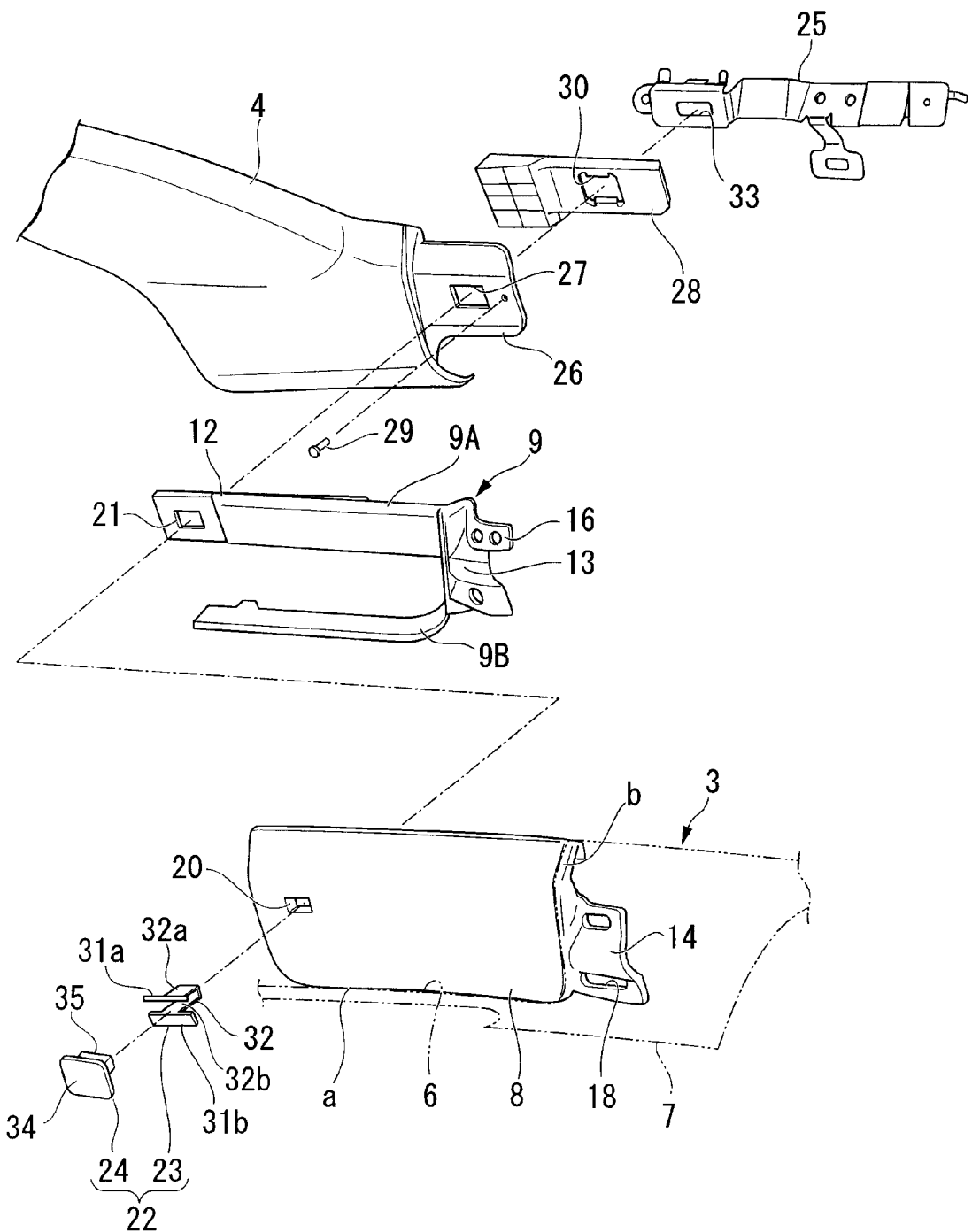
FIG. 4 is an exploded perspective view of the interior member according to the embodiment, seen from the vehicle interior side.
Figure 5:
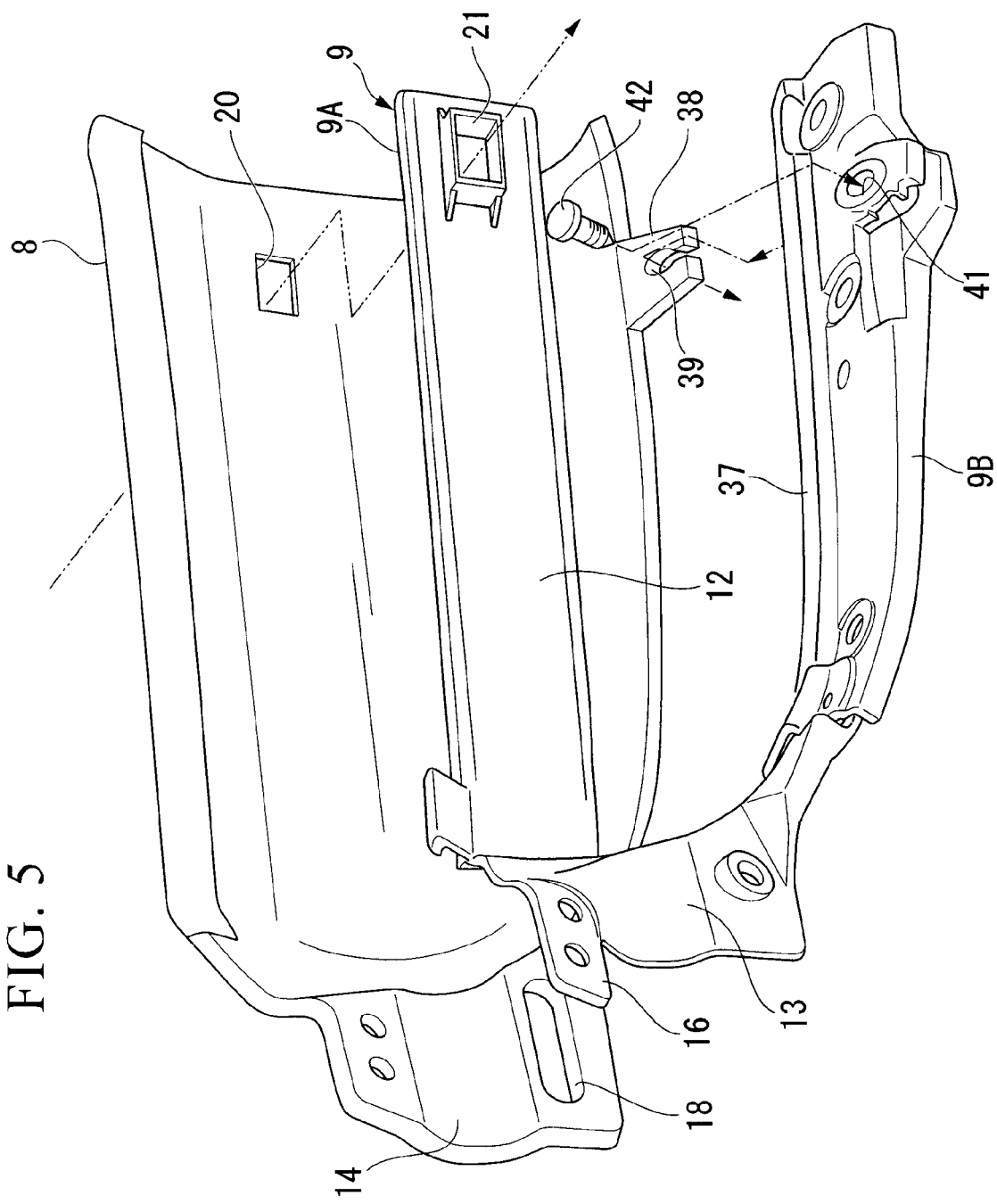
FIG. 5 is an exploded perspective view of the interior member according to the embodiment, seen from the vehicle exterior side

FIG. 2 and FIG. 5 are a perspective view and an exploded perspective view of the pillar garnish 3, seen from the vehicle exterior side. FIG. 3 and FIG. 4 are a perspective view and an exploded perspective view of a junction portion between a lower edge region on the rear side of the roof lining 4 and the pillar garnish 3, seen from the vehicle interior side.

As shown in these figures, the pillar garnish 3 includes: a garnish main unit 7 with a substantially L-shaped notch portion 6 in its upper edge region on the front side; a substantially rectangular garnish lid 8 for filling this notch portion 6; and a substantially U-shaped garnish frame 9 arranged on the back surface side of the garnish lid 8 for mainly reinforcing the garnish lid 8. A lower edge region on a rear side of the roof lining 4 is united with a front end portion of the garnish lid 8. It is arranged within the notch portion 6 of the garnish main unit 7 together with the garnish lid 8. Lower edges of the roof lining 4 and the garnish lid 8 are located below the container portion of the airbag 5. They are pushed open (open an expansion opening for the airbag 5) by a thrust of the airbag 5 when the airbag 5 expands. Both of the roof lining 4 and the garnish lid 8 are formed mainly from a foaming resin material which is comparatively soft and is easy to transform. Furthermore, the garnish main unit 7 is fixedly locked on the rear pillar 1, or on a trim member (not shown in the figures) and the like of the vehicle interior with a clip 10, locking hooks 11, and the like.

The garnish frame 9 includes: an upper support frame member 9A (an upper portion support portion) for supporting an upper region of the garnish lid 8 (in the case of this example, a region which is deviated a little further upward than a central position in the up-down direction, swelling into the vehicle interior side) substantially along the longitudinal direction of the lid 8; and a lower lock frame member 9B (a boundary support portion) which is mounted so as to extend along a lower boundary portion between the garnish lid 8 and the garnish main unit 7 and which faces a lower end of the notch portion 6 of the garnish main unit 7, for locking a lower edge portion of the garnish lid 8. These frame members 9A, 9B are integrally coupled by screwing or the like. They are formed from a non-foaming, hard resin material.

The upper support frame member 9A includes: a longitudinal extension portion 12 which extends substantially straight along the longitudinal direction from the vicinity of the front end of the garnish lid 8 to the rear portion thereof, and a curving extension portion 13 which curves from a rear end of this longitudinal extension portion 12 along a rear boundary portion b between the garnish lid 8 and the garnish main unit 7. A lower end of the curving extension portion 13 is coupled with a rear end portion of the lower lock frame member 9B.

In a rear end portion of the garnish lid 8, there is integrally formed a substantially rectangular tongue piece portion 14 which goes over the notch portion 6 to extend to a back surface side of the garnish main unit 7. Two (front and rear) places on an upper edge side of this tongue piece portion 14 is integrally coupled with the garnish main unit 7 and the curving extension portion 13 of the upper support frame member 9A by means of screws 15. The area fixed by these screws 15 constitutes a fixation portion for fixing the garnish main unit 7, the garnish lid 8, and the garnish frame 9 so as not to be spaced apart from each other. At a position in the vicinity of this fixation portion on the back surface side of the garnish main unit 7, there is protrudingly provided a boss portion 17 for fixation onto the vehicle body. The boss portion 17 is fixed on the rear pillar 1 with the clip 10. That is, a rear end of the upper region of the garnish lid 8 is fixed on the rear pillar 1 via the screw 15 and the clip 10. The screw 15 and clip 10 constitute a vehicle body fixation portion on the rear end side of the upper region.

In a lower edge of the tongue piece portion 14 (a corner region at a terminal end along an extension direction of the lower boundary portion a of the garnish main unit 7), there is formed an oval hole 18 along the extension direction of the lower boundary portion a. A lower edge of the curving extension portion 13 of the garnish frame 9 is coupled with the backside of the garnish main unit 7 by means of a bolt 19 which extends through this oval hole 18. The lower edge of the tongue piece portion 14 is arranged between the garnish frame 9 and the garnish main unit 7 at a fastening portion by the bolt 19. The oval hole 18 portion slides with respect to the bolt 19. That is, for the lower edge of the tongue piece portion 14, a relative displacement along the lower boundary portion a is allowed with respect to the garnish main unit 7. Therefore, for the lower edge of the tongue piece portion 14, a relative displacement along the lower boundary portion a is allowed by the bolt 19 and the oval hole 18 with respect to the garnish main unit 7, but relative displacements in the other directions are restricted. The coupling portion by the bolt 19 and the oval hole 18 constitutes a main unit coupling portion of the lower region of the garnish lid 8.

Furthermore, in the vicinity of the front end of the upper region of the garnish lid 8, there is formed a substantially rectangular mounting hole 20 (a through-hole). In the upper support frame member 9A of the garnish frame 9, there is formed a substantially rectangular through-hole 21 at a position corresponding to the position where the mounting hole 20 of the garnish lid 8 is formed. Into these mounting hole 20 and through-hole 21, there is inserted a clip 22, which is their common locking member, from the vehicle interior side in succession. Thereby, the upper region of the garnish lid 8 is coupled with the upper support frame member 9A in an overlapping manner. This coupling portion by the clip 22 constitutes a vehicle body fixation portion on a front end side of the upper region of the garnish lid 8.

The clip 22 is, as shown in FIG. 4, includes: a clip main unit 23 made of metal; and a clip cap 24 (a main unit support member) made from a resin, which is mounted to this clip main unit from the vehicle interior side. The clip main unit 23 mainly couples the garnish lid 8 and the garnish frame 9 to a fixation bracket 25 on the rear pillar 1 side (a fixation member on the vehicle body side). In addition, the clip cap 24 covers the clip main unit 23 from the vehicle interior side.

In the lower edge region on the rear side of the roof lining 4, there is extendingly provided a substantially rectangular connection flange 26 so as to extend to the back surface side of the front end portion of the garnish lid 8, as shown in FIG. 3 and FIG. 4. In the connection flange 26, there is formed a substantially rectangular through-hole 27. Furthermore, on the backside of the connection flange 26, there is mounted a shock absorber member 28 between the backside of the roof lining 4 and the rear pillar 1 by means of the screw 29 (see FIG. 4), for relieving an interfering shock from the vehicle interior side of the roof lining 4. This shock absorber member 28 is formed from a comparatively hard, non-foaming resin material. In addition, at a position corresponding to the through-hole 27 of the connection flange 26, there is formed a similar through-hole 30.

Figure 8:
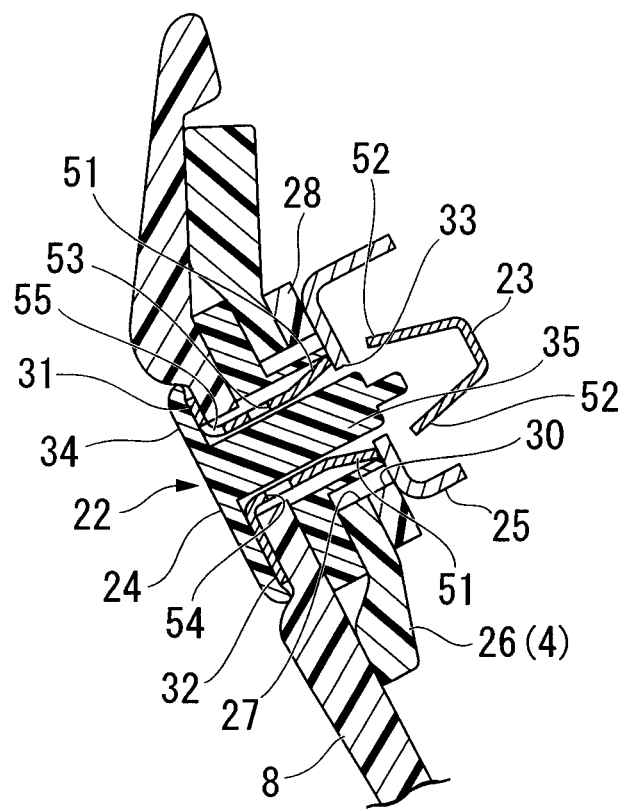
FIG. 8 is a cross-sectional view taken along the C-C line in FIG. 2.

The clip main unit 23 has: an upper flange 31a and a lower flange 31b which are overlapped over opening edges on the vehicle interior side of the mounting hole 20 of the garnish lid 8; and a leg portion 32 which extends in an insertion axis direction from the base portions of the flanges 31a, 31b, and which has substantially a U-shape in cross section. As shown in the cross-sectional view of FIG. 8, after this leg portion 32 is inserted into the mounting hole 20 of the garnish lid 8 and the through-hole 21 of the garnish frame 9, the clip main unit 23 is locked in a locking hole 33 of the fixation bracket 25 on the vehicle body side. At this time, the connection flange 26 and the shock absorber member 28 are overlapped on the back surface of the upper support frame 9A so that the through-holes 27, 30 are aligned with the through-hole 21 of the upper support frame member 9A, and the leg portion 32 of the clip main unit 23 is locked in the fixation bracket 25. Thereby, the connection flange 26 and the shock absorber member 28 are sandwichedly fixed between the upper support frame member 9A and the fixation bracket 25.

Figure 6:
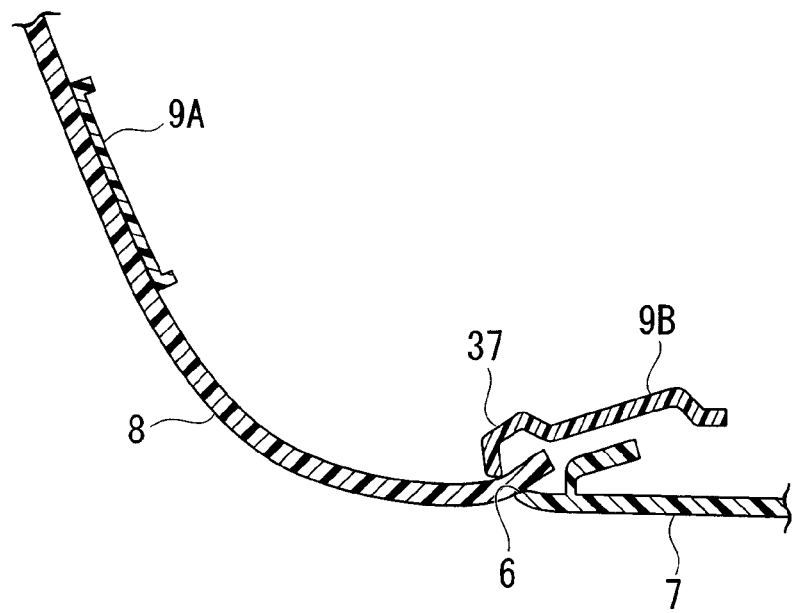
FIG. 6 is a cross-sectional view taken along the A-A line in FIG. 2.
Figure 7:
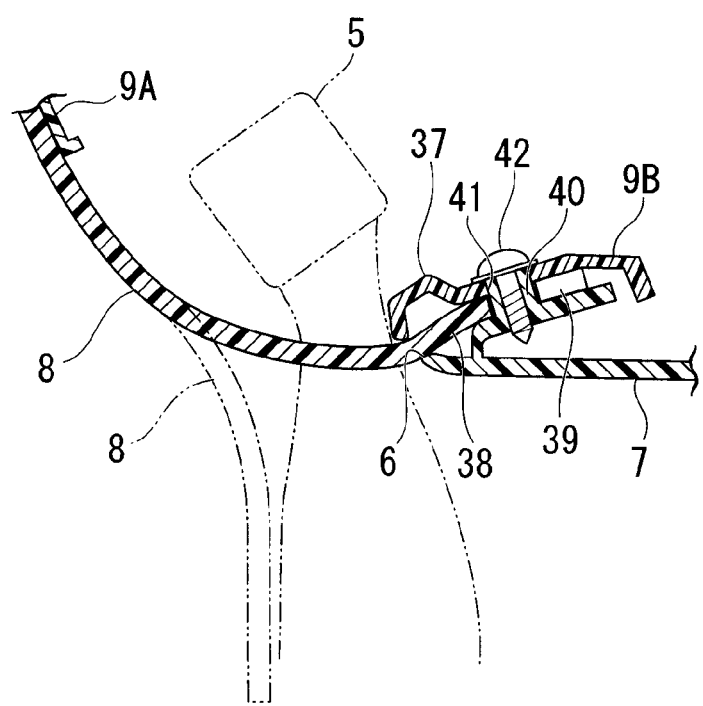
FIG. 7 is a cross-sectional view taken along the B-B line in FIG. 2.

Furthermore, as shown in FIG. 1, a plurality of places spaced apart in the longitudinal direction of the lower lock frame member 9B of the garnish frame 9 are coupled to the back surface side of the garnish main unit 7 at positions along the lower end of the notch portion 6 by means of screws 36. In an upper edge portion of the lower lock frame member 9B, there is formed a lock flange 37 (a sandwichingly coupling portion) whose distal end is bent in a substantially square U-shape for holding the lower edge of the garnish lid 8 between itself and an edge of the garnish main unit 7, as shown in FIG. 6 and FIG. 7. The lower end of the garnish lid 8 is inserted into a backside of an edge of the garnish main unit 7, the edge facing the notch portion 6, over the whole region along the longitudinal direction, and is sandwichedly fixed between that edge and the lock flange 37 of the lower lock frame member 9B.

Figure 9:
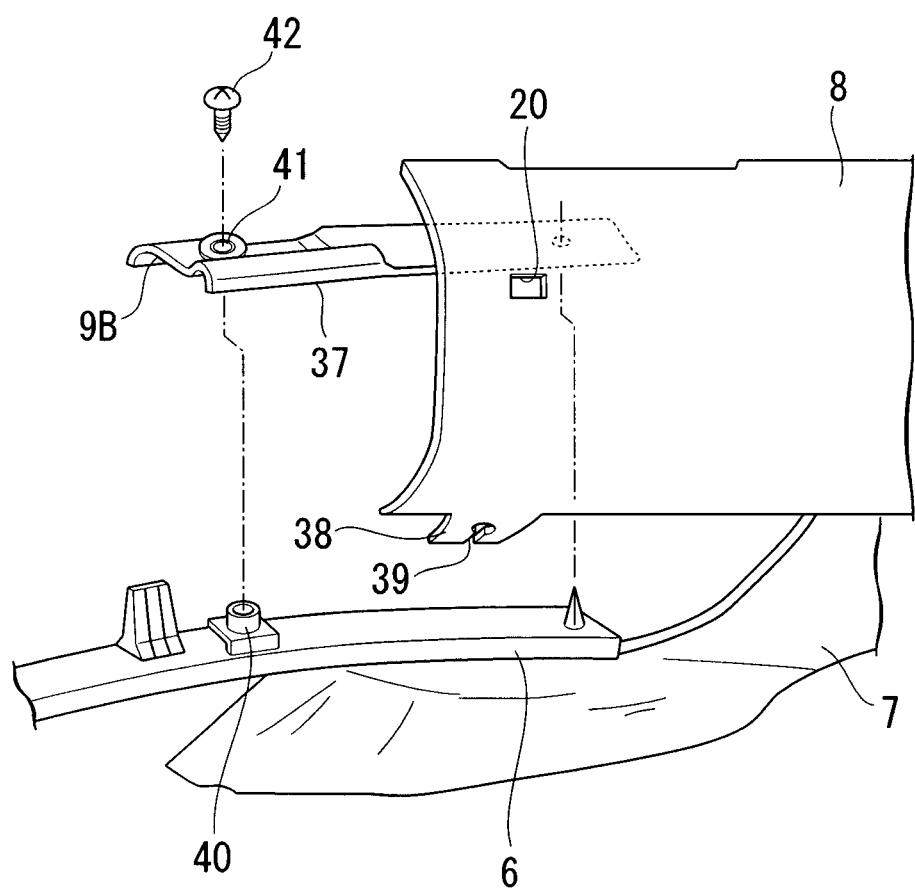
FIG. 9 is an exploded perspective view of the interior member according to the embodiment, seen from the vehicle interior side.

FIG. 9 is an exploded perspective view of an engaging portion between the garnish main unit 7 and the lower end of the garnish lid 8, seen from the vehicle interior side.

In the portion in the vicinity of the front end portion of the lower edge of the garnish lid 8, there is extendingly provided a supplemental sandwiching piece 38 which extends toward the lower end direction, as shown in FIG. 9, FIG. 5, and FIG. 7. In the supplemental sandwiching piece 38, there is formed a substantially U-shaped slit which opens toward its distal end. Furthermore, in the edge portion on the back surface side of the garnish main unit 7, there is protrudingly provided a boss portion 40 at a position spaced apart from the notch portion 6 (the lower boundary portion a) in the width direction (on the lower side). At a position of the lower lock frame member 9B which corresponds to the boss portion 40, there is formed a through-hole 41 into which a distal end portion of the boss portion 40 is fit. When the lower edge of the garnish lid 8 is inserted between the lock flange 37 and the edge of the garnish main unit 7 and locked, the slit 39 of the supplemental sandwiching piece 38 is engaged with an outer periphery of the boss portion 40, and a screw 42 (a supplemental coupling portion) is coupled to the boss portion 40 which has extended through the through-hole 41 of the lower lock frame member 9B. As a result, the supplemental sandwiching piece 38 is sandwichedly fixed between the lower lock frame member 9B and the garnish main unit 7.

As described above, the garnish frame 9 reinforces the upper region of the garnish lid 8 with the upper support frame member 9A, and also sandwiches the lower edge of the garnish lid 8 in two stages at: the portion in the vicinity of the lower boundary portion a; and the supplemental sandwiching piece 38 portion which is spaced apart from the lower boundary portion a. On the other hand, at a position on the upper side of a substantially U-shaped space portion surrounded by the upper support frame member 9A and the lower lock frame member 9B, there is arranged a folded airbag 5, as shown in FIG. 7. In expansion of the airbag 5, a thrust by the airbag 5 lunging downward releases the two-stage sandwiching of the lower edge of the garnish lid 8 by the garnish main unit 7 and the lower lock frame member 9B. As a result, the lower edge of the garnish lid 8 is pushed open to the vehicle interior side, as shown by a double-dot chain line in FIG. 7. Note that a lock load on the garnish lid 8 at the supplemental sandwiching piece 38 is set large compared with that at the lock flange 37.

The pillar garnish 3 as described above is made of discrete members of the garnish main unit 7, the garnish lid 8, and the garnish frame 9. In a stage prior to assembly onto the vehicle body, these three are pre-assembled. The pre-assembled pillar garnish 3 is transferred as it is to an assembly position onto the vehicle body. It then is assembled onto the vehicle body together with other interior members such as the roof lining 4 by means of a clip and the like.

In expansion of the airbag 5, when the airbag 5 pressed the lower edge of the garnish lid 8 from the inside thereof, the lower edger of the garnish lid 8 is disengaged from the sandwiching portion between the garnish main unit 7 and the lower lock frame member 9B, and then the lower edge is pushed open to the vehicle interior side about a hinge fulcrum I (see FIG. 3) connecting the coupling portion by the clip 22 with the coupling portion by the bolt 19. In the meantime, on the rear end side of the garnish lid 8, the tongue piece portion 14 is relatively displaced with respect to the bolt 19 at the oval hole 18 portion, and is largely pulled out to the vehicle interior side so as to slide along the lower boundary portion a. Therefore, the garnish lid 8 smoothly and widely opens an extension opening for the airbag 5 without receiving a great restraining force on the rear end side.

Hereunder is a detailed description of the clip 22 which fixes the front end portion of the garnish lid 8 together with the garnish frame 9 onto the fixation bracket 25 on the rear pillar 1 side, with reference to FIG. 10 to FIG. 14. In the following description of the clip 22, the side on which the upper flange 31a is arranged is referred to "upper," and the side on which the lower flange 31b is arranged is referred to "lower," in the finally assembled state, unless otherwise specified.

This clip 22 is made of: the clip main unit 23 made of a metal; and the clip cap 24 made from a resin, as described above. It is designed so that these are assembled in a manner different from the finally assembled state and that when the pillar garnish 3 is mounted on the vehicle body, the leg portion 32 of the clip main unit 23 can be locked in the fixation bracket 25 with ease.

The clip main unit 23 is formed by pressing a metal plate. As shown in the perspective view of FIG. 10, in the base portions of the substantially rectangular upper flange 31a and lower flange 31b, there are extendingly provided opposing walls 32a, 32b, respectively, with substantially the same width as the inner width of the through-hole 21 (see FIG. 4) of the garnish frame 9, so as to be in parallel with each other. The distal ends of both opposing walls 32a, 32b are linked with each other by means of a narrow, substantially U-shaped linking wall 50. The aforementioned leg portion 32 is made of these opposing walls 32a, 32b, and the linking wall 50. An extension length L1 to the lower side of the lower flange 31b is set to be longer than an extension length L2 to the upper side of the upper flange 31a. It is configured such that in a state where the clip main unit 23 is mounted on the garnish lid 8, a pressing amount of the garnish lid 8 by the lower flange 31b is set to be larger than that of the garish lid 8 by the upper flange 31a. In the distal regions of the opposing walls 32a, 32b, there are respectively formed a pair of locking nails 51, 52 with being cut and bent. When the distal end portion of the leg portion 32 is inserted into the locking hole 33 of the fixation bracket 25 (see FIG. 8), these locking nails 51, 52 lock the hole edges of the locking hole 33 in the front-rear direction.

At positions of the opposing walls 32a, 32b closer to the base ends than the locking nails 51, 52, there are respectively formed substantially rectangular holding holes 53, 54. In a portion where the first opposing wall 32a and the upper flange 31a are joined, there is formed a substantially rectangular locking hole 55. The portion where the upper flange 31a and the first opposing wall 32a are joined is gently curved. The locking hole 55 is formed across the curved region. The holding hole 53 of the first opposing wall 32a and the holding hole 54 of the second opposing wall 32b are arranged in an offset manner in an insertion axis line p direction. The first holding hole 53 is arranged closer to the distal end than the second holding hole 54.

On the other hand, the clip cap 24 includes: a flat-plate-shaped cover flange 34 for covering the upper flange 31*a* and the lower flange 31*b* of the clip main unit 23 from the vehicle interior side; and a support axis 35 which is extendingly provided on the cover flange 34 and is pressed into and thereby fixed to an opening 56 between the opposing walls 32*a*, 32*b* of the clip main unit 23. The cover flange 34 is formed asymmetrically in the up-down direction with respect to the support axis 35. In the cover flange 34, an extension length L3 on the lower side is set to be longer than an extension length L4 on the upper side in correspondence to the upper flange 31*a* and the lower flange 31*b* of the clip main unit 23. Therefore, when the clip cap 24 is attached into the clip main unit 23 correctly in the up-down direction, the cover flange 34 completely covers the upper flange 31*a* and the lower flange 31*b* of the clip main unit 23. However, when the clip cap 24 is attached into the clip main unit 23 upside down, the lower flange 31*b* is protruded from the lower part of the cover flange 34.

The support axis 35 of the clip cap 24 includes: a pair of side walls 57, 57 arranged on the back surface of the cover flange 34 at a predetermined distance apart from each other in the longitudinal direction (in the lateral direction in FIG. 10); and an apex wall 58 for joining end faces of the side walls 57, 57. In the vicinity of the central portion of the apex wall 58, there are protrudingly provided a pair of support walls 59*a*, 59*b* which extend along the axis direction. The pair of support walls 59*a*, 59*b* are arranged at a predetermined distance apart from each other in the longitudinal direction as the side walls 57, 57. A width of the support walls 59*a*, 59*b* themselves is set to be narrower than a width between the opposing walls 32*a*, 32*b* of the clip main unit 23. On the other hand, a width of the side wall 57 on the base side is set to be substantially the same as a width between the opposing walls 32*a*, 32*b*. The side walls 57, 57 are press-fit between the opposing walls 32*a*, 32*b* in a state where the clip cap 24 is finally assembled onto the clip main unit 23 (in a state where the support axis 35 is completely inserted). The leg portion 32 of the clip main unit 23 is supported from inside by this press fitting.

On the support walls 59*a*, 59*b*, there are respectively formed locking protrusions 60, 61 which protrude in the opposite directions across the insertion axis line p. These locking protrusions 60, 61 are arranged so as to be offset from each other in a direction along the insertion axis line p. One locking protrusion 60 is fittable into one holding hole 53 of the clip main unit 23. The other locking protrusion 61 is fittable into the other holding hole 54 of the clip main unit 23. In the distal ends of the locking protrusions 60, 61, there is respectively provided an arc face, allowing them to be engageable/disengageable with/from the corresponding holding holes 53, 54 through rotation of the support axis 35 about the insertion axis line p.

Figure 10:
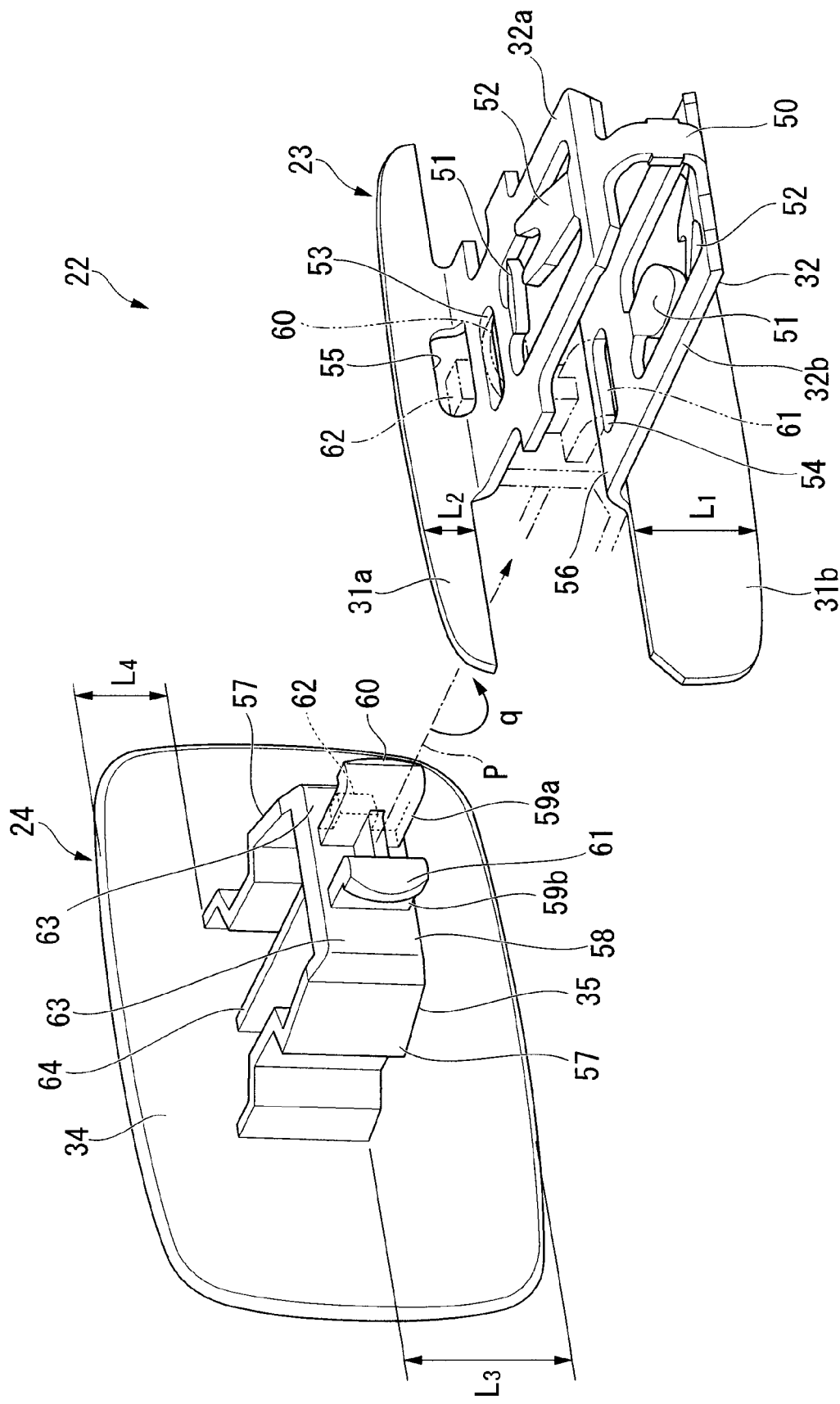
FIG. 10 is an exploded perspective view of a clip for a vehicle according to the embodiment.

On the base end of the first support wall 59*a*, there is provided a rotation restricting protrusion 62 fittable into the clip main unit 23, protruding in the same direction as the locking protrusion 60. This rotation restricting protrusion 62 is arranged so as to be deviated upward from the insertion axis line p when the clip cap 24 is in its normal rotation angle position with respect to the clip main unit 23, as shown in FIG. 10. As a result, the support axis 35 of the clip cap 24 is half-inserted (in a state where only the support walls 59*a*, 59*b* on the distal end side of the support axis 35 are inserted) into the opening 56 of the clip main unit 23 in the normal rotation angle position. In the case where the clip cap 24 is rotated in a selected direction q from this state, rotation of the clip cap 24 is allowed until the rotation restricting protrusion 62 comes in contact with one edge in the locking hole 55, preventing further rotation of the clip cap 24 in the selected direction q. At this time, the locking protrusions 60, 61 are engaged with the corresponding holding holes 53, 54. In addition, the clip cap 24 and the clip main unit 23 are joined with each other so as to restrict their relative displacement in the axis direction. At this time, portions in the vicinity of the corners on both sides of the apex wall 58 of the clip cap 24 are in contact with the respective base portions of the upper flange 31*a* and the lower flange 31*b* of the clip main unit 23. Therefore, when a load in the insertion axis line p direction is input to this clip cap 24, that load is transmitted to the clip main unit 23. These portions in the vicinity of the corner portions on both sides of the apex wall 58 constitute load transmission portions 63. Furthermore, between a central portion of the cover flange 34 and a central portion of the apex wall 58, there is provided a load transmission wall 64 for directly linking both.

The locking protrusions 60, 61 and the holding holes 53, 54 constitute a clip linking device between the clip cap 24 and the clip main unit 23. The rotation restricting protrusion 62 and the locking hole 55 constitute a rotation restricting device between the clip cap 24 and the clip main unit 23. The locking protrusions 60, 61 and the holding holes 53, 54 are arranged in an offset manner in the insertion axis line p direction, respectively, as described above. Only in the case where the clip cap 24 is rotated in the selected direction q from the half-inserted state, the corresponding locking protrusions and holding holes are engaged with each other. In the case where the clip cap 24 is intended to be rotated in the direction reverse to the selected direction q, they function so as to prevent the rotation itself of the clip cap 24. The offset arrangement of the locking protrusions 60, 61 and the holding holes 53, 54 constitute a restriction mechanism for restricting a rotation direction of the clip cap 24 with respect to the clip main unit 23.

Here, in the clip 22 in a pre-stage of assembling the pillar garnish 3 onto the vehicle body, the leg portion 32 of the clip main unit 23 is fit into the mounting hole 20 of the garnish lid 8 and the through-hole 21 of the garnish frame 9, and the support axis 35 of the clip cap 24 is half-inserted into the opening 56 of the leg portion 32 of the clip main unit 23 for temporary assembly.

Figure 11:
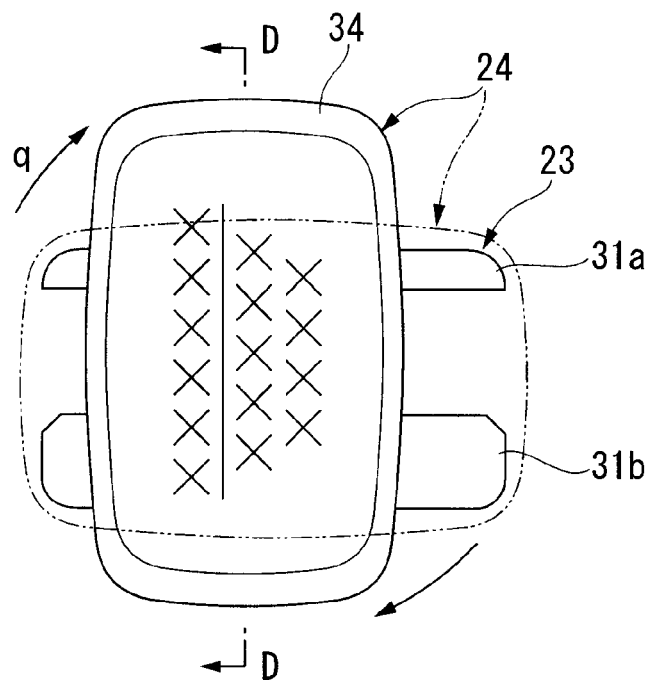
FIG. 11 is a front view of the clip for a vehicle according to the embodiment.
Figure 12:
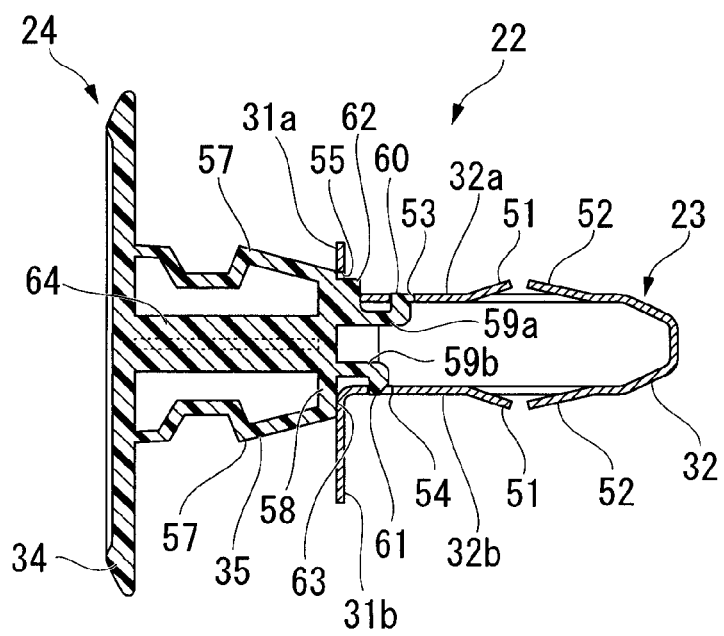
FIG. 12 is a cross-sectional view taken along the D-D line in FIG. 11.
Figure 13A:
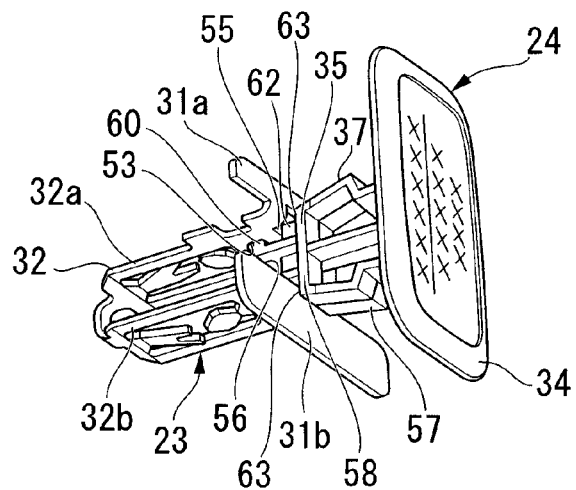
FIG. 13A to FIG. 13C are perspective views showing assembly steps for the clip for a vehicle according to the embodiment.

At this time, firstly as shown in FIG. 10, while the clip cap 24 is maintained in a normal rotation angle position with respect to the clip main unit 23, the distal end portion of the support axis 35 is inserted into the opening 56 of the leg portion 32 of the clip cap 24, and the clip cap 24 is rotated as it is in the selected direction by a quarter turn of a rotation. At this time, the locking protrusions 60, 61 of the clip cap 24 and the rotation restricting protrusion 62 are respectively engaged with the corresponding holding holes 53, 54 and the locking hole 55 of the clip main unit 23. Thereby, as shown in FIG. 11, FIG. 12, and FIG. 13A, the clip cap 24 and the clip main unit 23 are coupled so as to restrict their relative displacement in the axis direction.

When the pillar garnish 3 is actually mounted onto the rear pillar 1 from this state, the distal end portion of the leg portion 32 of the clip main unit 23 which is protruded from the through-hole 21 of the garnish frame 9 is inserted into the through-hole 27 of the roof lining 4 and the through-hole 30 of the shock absorber member 28. In that state, a load in the axis direction is input to the clip main unit 23, to thereby fixedly press the leg portion 32 into the locking hole 33 of the fixation bracket 25. When the clip main unit 23 is pressed into the fixation bracket 25, a hand is put over the cover flange 34 of the clip cap 24, which is temporarily assembled onto the clip main unit 23 and protruded from the garnish lid 8. Then the edge face of the cover flange 34 is pressed to apply a load in the axis direction to the clip main unit 23.

Figure 13B:
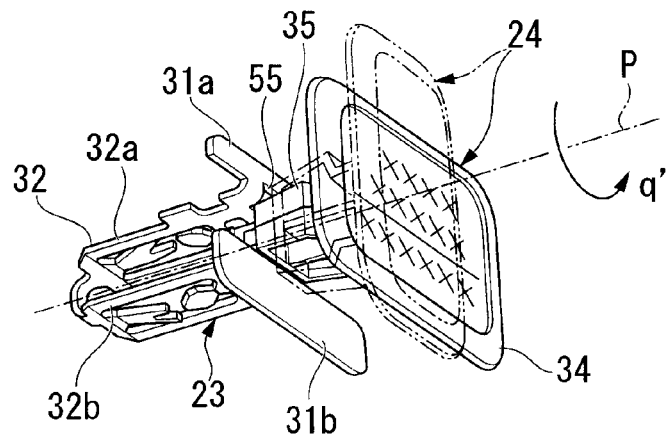
Figure 13C:
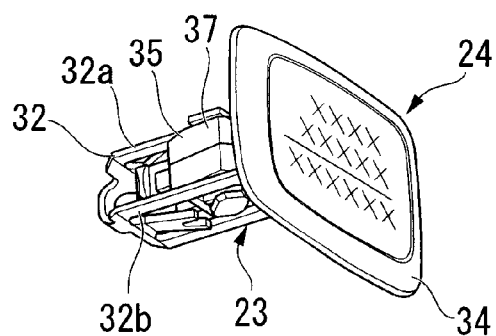
Figure 14:
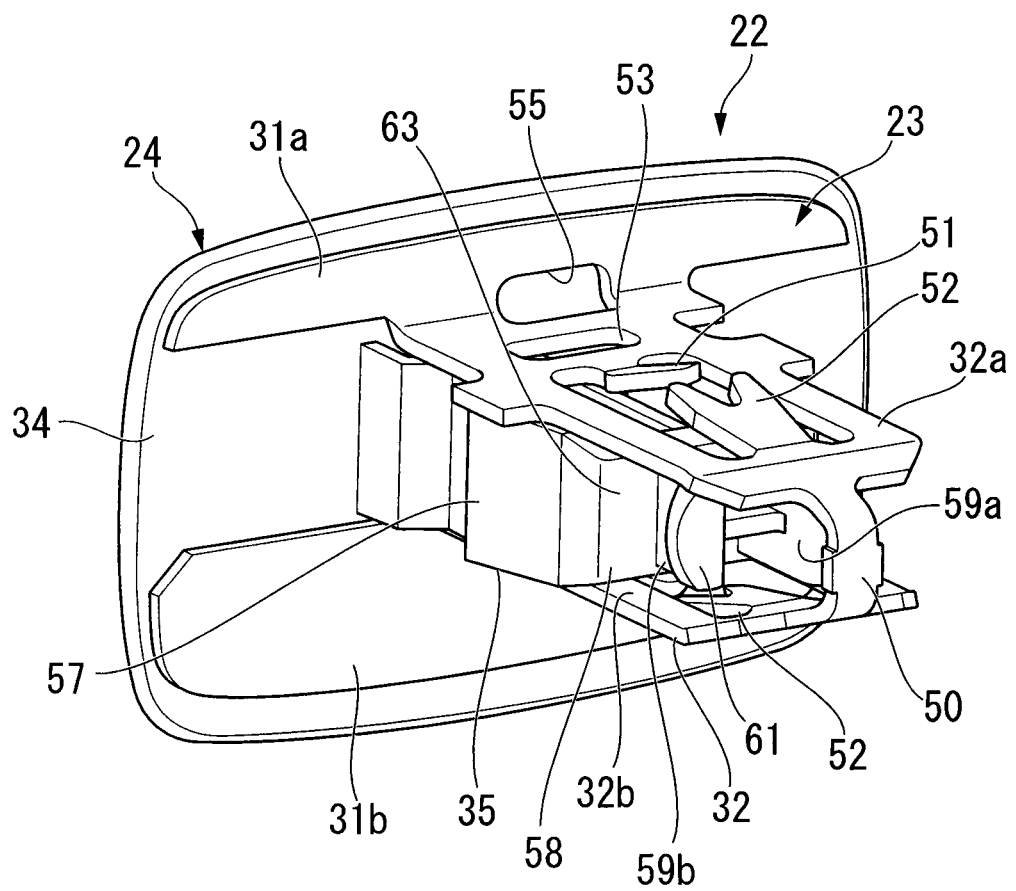
FIG. 14 is a perspective view of the clip for a vehicle according to the embodiment.

After the leg portion 32 of the clip main unit 23 is fixed in the fixation bracket 25 in this manner, the clip cap 24 is rotated in a direction q' which is reverse to the selected direction q by a quarter turn of a rotation, as shown in FIG. 13B, to thereby return the clip cap 24 to the initial rotation angle position. After this, the clip cap 24 is further pressed down in the axis direction to insert the support axis 35 of the clip cap 24 completely into the opening 56 of the clip main unit 23, as shown in FIG. 13C and FIG. 14. When the clip cap 24 is pressed down to the full in this manner, the leg portion 32 of the clip main unit 23 comes to be supported from the inside thereof by the support axis 35. In addition, the upper flange 31a and the lower flange 31b of the clip main unit 23 are completely covered with the cover flange 34.

As described above, the clip 22 used here links the clip main unit 23 and the clip cap 24, which supports the leg portion 32 of the clip main unit 23 from the inside thereof, in a half-inserted state through engagement between the locking protrusions 60, 61 and the holding holes 53, 54. Furthermore, the clip 22 can transmit a pressing load in the axis direction to the clip main unit 23 via the clip cap 24. Therefore, the pillar garnish 3 can be mounted onto a vehicle body with extreme ease without using a dedicated jig or the like. Then, after the clip main unit 23 is pressed into and thereby fixed to the fixation bracket 25, the support axis 35 of the clip cap 24 is completely inserted into the inside of the leg portion 32 of the clip main unit 23, to thereby make it possible to completely cover the upper flange 31a and the lower flange 31b of the clip main unit 23 with the cover flange 34 of clip cap 24. As a result, an appearance from the vehicle interior can be improved.

According to a mounting method of the pillar garnish 3 as an interior member onto a vehicle body by use of this clip 22 in the above procedure, the pillar garnish 3 can be mounted onto the vehicle body through an extremely simple operation.

Especially, according to the above procedure, mounting of an interior member onto a vehicle body can be completed through a series of simple operations in which: a load in the axis direction is applied to the clip cap 24 temporarily assembled, to thereby press the clip main unit 23 together with the pillar garnish 3 into the vehicle body side; the clip cap 24 is then rotated to be returned to its initial rotation angle position; and press it into the leg portion 32 of the clip main unit 23. As a result, mounting work of an interior member is allowed to proceed extremely effectively.

Furthermore in this clip 22, the clip cap 24 and the clip main unit 23 are respectively provided with the rotation restricting protrusion 62 and the locking hole 55. Because of this, it is restricted for the clip cap 24 to be further rotated in the selected direction q from the temporarily assembled state by the engagement between the rotation restricting protrusion 62 and the locking hole 55. As a result, in the case where the clip cap 24 is reversely rotated with respect to the clip main unit 23 to be returned to its initial rotation angle position, it is possible to prevent the situation where the clip cap 24 is erroneously rotated in the selected direction q to assemble the clip cap 24 upside down.

Furthermore, in this clip 22, the locking protrusions 60, 61 of the clip cap 24, and the holding holes 53, 54 of the clip main unit 23 are respectively arranged in a manner offset in the insertion axis line p direction. Therefore, it is restricted for the operation on the clip cap 24 which is half-inserted into the clip main unit 23 in the normal rotation angle position to be rotated in the direction reverse to the selected direction q. As a result, it is possible to securely prevent a temporary assembly of the clip main unit 23 and the clip cap 24 in the reverse direction.

Furthermore, in this embodiment, when the clip cap 24 is half-inserted into the clip main unit 23 with an orientation 180° different from the normal rotation angle position, a rotation in the direction reverse to the selected direction q for the clip cap 24 is restricted due to the positional relationship between the rotation restricting protrusion 62 and the locking hole 55. That is, in this case, the clip cap 24 does not rotate in both directions. This allows a worker to instantaneously recognize that the clip cap 24 is about to be assembled in the wrong orientation.

Furthermore, in the case where this clip 22 is used, it is possible to bring the load transmission portions 63 on the apex wall 58 of the clip cap 24 into contact with the base portions of the upper flange 31a and the lower flange 31b of the clip main unit 23 in a state where the clip cap 24 is temporarily assembled onto the clip main unit 23. As a result, a pressing load in the axis direction which is input to the clip cap 24 can be securely and efficiently transmitted to the clip main unit 23.

The present invention is not limited to the above embodiment, and various design modifications can be made as long as they do not depart from the spirit or scope of the present invention.

While a preferred embodiment of the invention has been described and illustrated above, it should be understood that this is exemplary of the invention and is not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An assembly for securing an interior member to a vehicle body, said assembly comprising a clip and a fixation member, said fixation member being secured to the vehicle body and adapted to receive said clip, said clip comprising:

a substantially hollow clip main unit extending through a mounting hole of the interior member, the clip main unit having a distal end portion adapted to be fixedly pressed into the fixation member on a vehicle body side, and having a base portion in which an opening is formed; and a main unit support member that is capable of supporting the clip main unit from an inside thereof when the main unit support member is completely inserted into the opening of the clip main unit, wherein the clip main unit and the main unit support member cooperate to provide a clip linking device, said clip linking device allows the clip main unit and the main unit support member to be in an engagement state in which the clip main unit and the main unit support member are engaged with each other so as to restrict relative displacement between the clip main unit and the main unit support member in both an insertion direction and an opposite, withdrawal direction when the main unit support member is half-inserted into the clip main unit and the main unit support member is in a first rotary orientation relative to the clip main unit, and wherein, upon rotation of said main unit support member from the first rotary orientation into a second rotary orientation relative to the clip main unit, the main unit support member and the clip main unit are released from the engagement state and the main unit support member may be moved in the withdrawal direction and in the insertion direction so as to permit withdrawal of the main unit support member from the clip main unit or full-insertion of the main unit support member into the clip main unit, said second rotary orientation being different than said first rotary orientation.

2. The assembly according to claim 1, wherein
the clip linking device places the clip main unit and the main unit support member into the engagement state by rotating the main unit support member, which is half-inserted into the clip main unit, in a predetermined direction into the first rotary orientation, and
the main unit support member, which is in the engagement state with the clip main unit, is allowed to be fully inserted into the clip main unit after the main unit support member is further rotated in a direction opposite to the predetermined direction from the first rotary orientation into the second rotary orientation.

3. The assembly according to claim 2, wherein
the main unit support member comprises a load transmission portion for transmitting a load, along the insertion direction, which is input from the clip main unit to the main unit support member in the engagement state.

4. The assembly according to claim 1, wherein
the main unit support member comprises a load transmission portion for transmitting a load, along the insertion direction, which is input from the clip main unit to the main unit support member in the engagement state.

5. An assembly for securing an interior member to a vehicle body, said assembly comprising a clip and a fixation member, said fixation member being secured to the vehicle body and adapted to receive said clip, said clip comprising:
a substantially hollow clip main unit extending through a mounting hole of the interior member, the clip main unit having a distal end portion adapted to be fixedly pressed into the fixation member on a vehicle body side, and having a base portion in which an opening is formed; and
a main unit support member that is capable of supporting the clip main unit from an inside thereof when the main unit support member is completely inserted into the opening of the clip main unit, wherein
the clip main unit and the main unit support member cooperate to provide a clip linking device, said clip linking device allows the clip main unit and the main unit support member to be in an engagement state in which the clip main unit and the main unit support member are engaged with each other so as to restrict the relative displacement in the insertion direction therebetween when the main unit support member is half-inserted into the clip main unit and the main unit support member is in a first rotary orientation relative to the clip main unit, said main unit support member being disposed in a second rotary orientation relative to the clip main unit to release the main unit support member and the clip main unit from the engagement state and thereby permit full-insertion of the main unit support member into the clip main unit, said second rotary orientation being different than said first rotary orientation; and,
a restriction mechanism for restricting a rotation of the main unit support member with respect to the clip main unit in a state where the main unit support member is half-inserted into the clip main unit.

6. The assembly according to claim 5, wherein
the main unit support member comprises a load transmission portion for transmitting a load, along the insertion direction, which is input from the clip main unit to the main unit support member in the engagement state.

* * * * *